Oct. 24, 1961 T. GASKINS 3,005,603
HELICOPTER
Filed Sept. 8, 1958 2 Sheets-Sheet 1
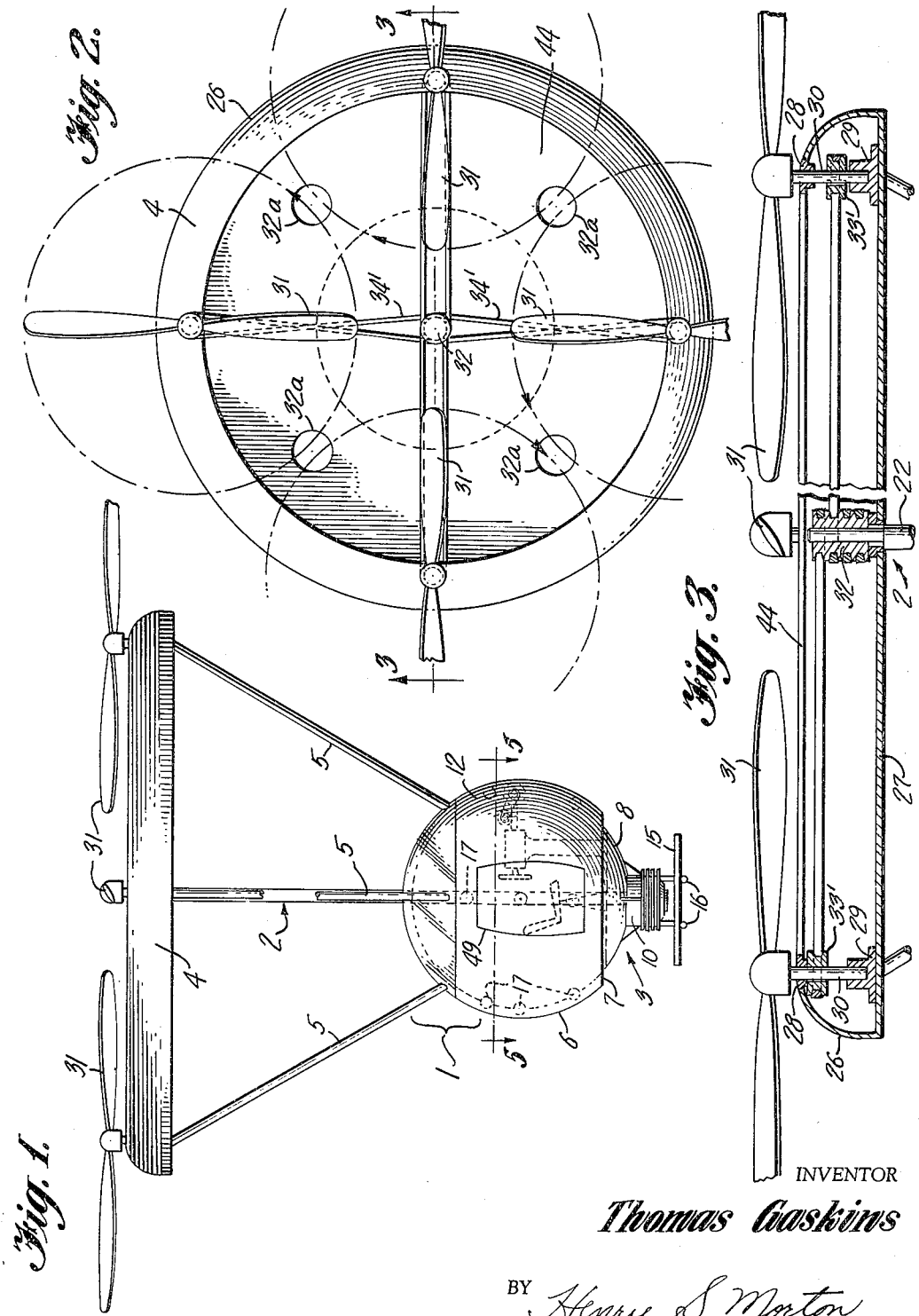
INVENTOR
*Thomas Gaskins*
BY *Henry S. Morton*
ATTORNEY Oct. 24, 1961  T. GASKINS  3,005,603
HELICOPTER
Filed Sept. 8, 1958  2 Sheets-Sheet 2

INVENTOR
*Thomas Gaskins*

BY *Henry S. Morton*
ATTORNEY

United States Patent Office 3,005,603
Patented Oct. 24, 1961

3,005,603
HELICOPTER
Thomas Gaskins, Palmdale, Fla.
Filed Sept. 8, 1958, Ser. No. 759,516
4 Claims. (Cl. 244—6)

This invention relates to the class of helicopters, and has for its general object the provision of a helicopter embodying structural features which promote safety, ease in maneuverability, simplicity in construction, and low cost of manufacture.

One of the specific objects of the invention is to provide a helicopter incorporating an airfoil canopy having the functions of a parachute, in the event of a dead motor, and being tiltable so that the helicopter can glide to earth, permitting the pilot to select a landing spot.

Another object of the invention is the provision of a helicopter of the type described, in which the airfoil canopy carries a plurality of propellers rotatable about parallel axes fixed relative to the airfoil and so balanced as to speed and direction of rotation as to prevent the development of any reactive torque tending to rotate the helicopter.

Still another object of the invention is to provide a helicopter comprising a sustaining member including an airfoil carrying a lifting propeller, axially at an invariable angle to the airfoil, and a pilot's compartment or car member freely suspended from said sustaining member by a universal joint remote from said airfoil, said sustaining member being tiltable as a unit about the center of articulation of said universal joint, for producing lateral flight, and control means actuable from said car member for tilting said sustaining member in any desired direction and for rotating said car member in azimuth.

Other objects of the invention will appear as the following description of an exemplary embodiment thereof proceeds.

In the drawings which accompany and form a part of the following specification, and throughout the several figures of which the same reference characters denote identical parts:

FIGURE 1 is a side elevation of a helicopter embodying the principles of the invention;

FIGURE 2 is a plan view;

FIGURE 3 is a diametrical cross-section taken along the line 3—3 of FIGURE 2;

Figure 4:
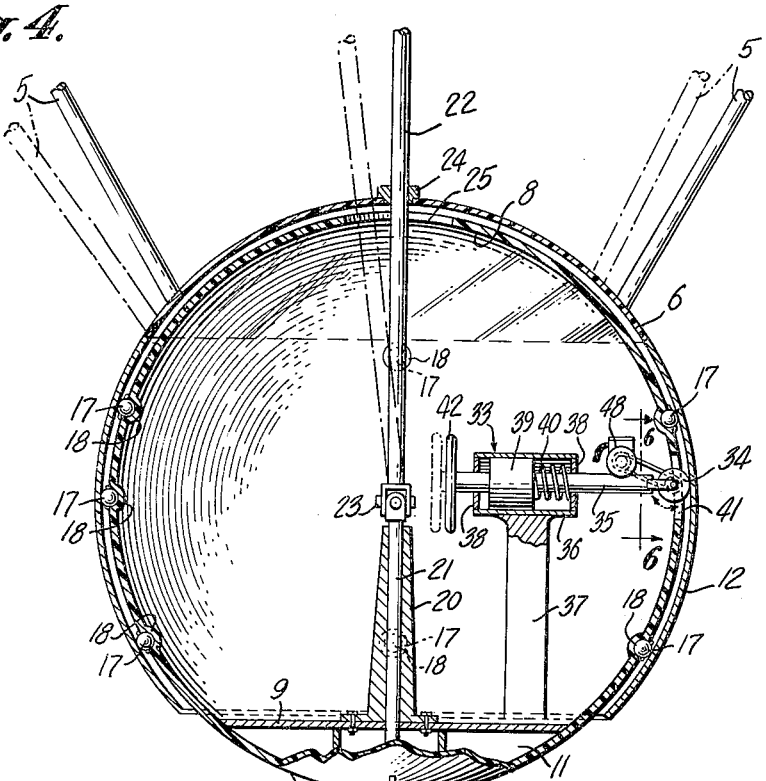
FIGURE 4 is a cross-section taken along the line 4—4 of FIGURE 5.
Figure 5:
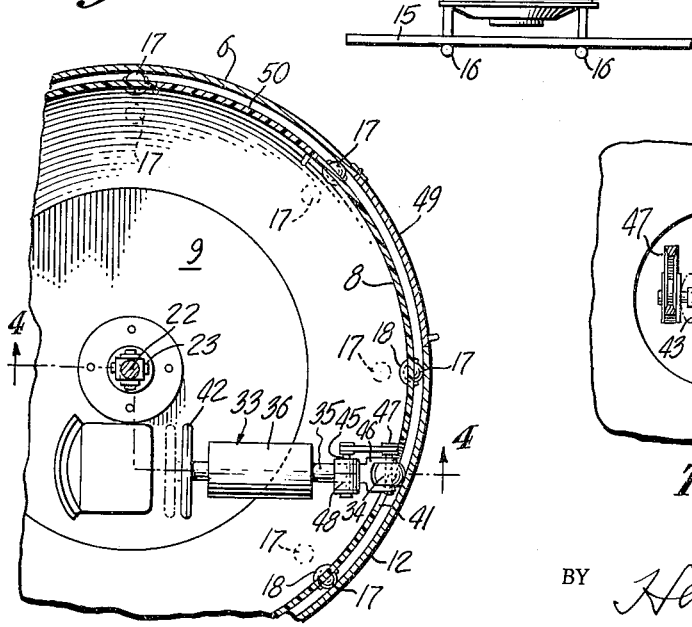
FIGURE 5 is a cross-section taken along the line 5—5 of FIGURE 1.

Referring now in detail to the drawings, FIGURE 1 shows that the helicopter 1 comprises upper and lower members 2 and 3. The upper member consists of the airfoil 4, which is rigid and connected rigidly by the struts 5 to an outer shell 6 of spherical curvature which extends downwardly to a plane below its horizontal great circle and parallel thereto. The lower member comprises an inner shell 8, which is also of spherical curvature, freely enveloped by and retained within the outer shell through the underlapping of the inner shell by the outer, the inner shell constituting the gondola and pilot's compartment.

The inner shell, as shown, has a floor 9, and below the floor, the power plant 10 and fuel chamber 11. Due to the low placement of weight, the lower member is gravitationally stable while air borne, remaining suspended on a constantly vertical axis.

The two shells are concentric and constitute a universal joint so that the upper member is tiltable in any direction relative to the lower member, and the two members are relatively rotatable in azimuth. The outer shell 6 is preferably of composite structure, having a wide metallic band 12 extending equidistantly on both sides of the horizontal equatorial plane of the shell. Above this zone, the outer shell has a transparent cap portion, giving the pilot a substantially unobstructed outlook throughout an amplitude of 360° in a lateral direction. The outer shell terminates at the lower edge of this band. The inner shell 8 is transparent at least down to floor level.

Suitable landing gear is secured to the bottom of the lower member 3, consisting of crossed bars 15 and 16, welded at their points of intersection. The medial portion of the inner shell is provided with circumferential series of ball bearings 17, retained in suitable sockets 18, which bear against the inner surface of the metallic band 12. The series of bearings are inset sufficiently from the upper and lower edges of the metallic band 12 to allow for the maximum practical range of tilt of the upper member 2.

A central post 20 extends upward from the floor 9, being suitably secured thereto, through which extends the lower section 21 of a drive shaft from the power plant, which rotates about a fixed axis. This section is connected at the common center of the shells to the upper tiltable section 22 of the drive shaft by a universal joint 23. Said upper section passes through a bearing 24 in the top of the outer shell, and tilts with the shell. The inner shell has a circular opening 25 in the top, surrounding said upper drive shaft section, being of sufficient radial amplitude to allow for the full range of practical tilt of the upper member 2 in all directions.

The airfoil 4 is circular in shape, having a convex peripheral edge 26 all around, so that it can be flown in any lateral direction without being turned, the height of the edge on the leading side producing vacuum above the airfoil, as in conventional airplanes during lateral flight. The airfoil has a bottom wall 27, but is open at the top, as indicated by the numeral 44. The peripheral edge forms with the bottom wall an annular recess which supports aligned upper and lower bearings 28 and 29 for the propeller shafts 30. The number of propellers is not critical to the invention. Four shafts are shown perpendicular to the plane of the bottom wall 27. The shafts extend above the airfoil and carry the propellers 31. In the interest of economy and simplicity it is contemplated that the propeller blades shall not be of the pitch adjusting type, but shall derive a component of force for lateral propulsion through the tilting of the propellers with the airfoil.

The propellers, as shown in FIGURES 2 and 3, are belt driven from a central pulley 32 at the upper end of the drive shaft section 22. Independent belts pass to pulleys 33' on the respective propeller shafts, two of the belts 34', being crossed so as to reverse the direction of rotation of alternate propellers. Since the propellers are of the same size and rotate at the same speed, this arrangement nullifies the development of any reactive force tending to rotate the helicopter.

FIGURE 2 shows that the bottom wall of the airfoil is provided with a pattern of openings 32, arranged preferably symmetrical with respect to the center of the bottom wall. These have the dual function of providing for the upward discharge of air from beneath the airfoil during vertical descent, reducing spillage at the edge, thereby steadying the airfoil; also of supplying some air to the propellers in those areas of their rotation which overlie the airfoil. They also provide drainage of storm water from the interior of the airfoil.

Figure 6:
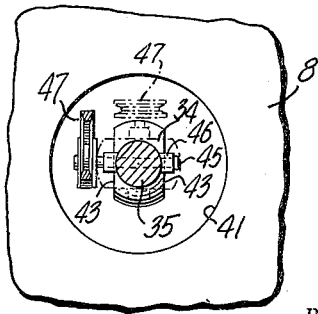
FIGURE 6 is a detail view taken along the line 6—6 of FIGURE 4, showing the clutch in its alternative extreme positions, respectively in full and broken lines.

It is to be understood that the belt system for driving the propellers is merely an equivalent insofar as this invention is concerned, of any other practical driving mechanism. Tilting of the upper member 2 relative to the gravitationally stable lower member 3 is accomplished, in the illustrated embodiment, by a power driven friction clutch mechanism, which as a whole is designated by the numeral 33, the clutch element 34 of which may be projected through an opening 41 in one side of the inner shell 8 into engagement with the smooth inner face of the metal band 12. The clutch 34 is at the outer end of a plunger 35 which passes through a hollow cylindrical guide 36 mounted on the end of a fixed post 37. The guide has closed ends 38 centrally perforated for the passage of the plunger. Intermediately the plunger is formed with an enlarged sylindrical slide 39 having a range of longitudinal movement within the guide. A spring 40 is housed within the guide between the slide and the end of the guide which is adjacent the opening 41. The spring holds the clutch out of contact with the band 12. A hand wheel 42 at the opposite end of the plunger permits the latter to be pushed contra to the spring into contact with the band 12, and also permits the plunger with the clutch 34 to be rotated at least through an angle of 90°. The clutch 34 preferably has the shape shown in full lines in FIGURE 6, having parallel side faces 43 and a circumferential face of spherical curvature transversely. The clutch is mounted on a shaft 45 having bearings in the bifurcations 46 of the plunger 35. The shaft also carries a pulley 47 belt driven from an electric motor 48, mounted on the adjacent portion of the plunger. The motor casing houses gear reduction mechanism, not shown, so that the clutch rotates at a reasonably slow speed. The motor may be run continuously during flight. The clutch 34 is made of material deformable under pressure, such as rubber, so that the spherical surface may conform to the shape of the surface of the band 12 when the clutch is pressed against it.

When it is desired to rotate the lower member in azimuth, the wheel 42 is first turned to bring the axis of the clutch perpendicular to the horizontal plane of the inner shell. The wheel is then pushed to press the rotating clutch into operative engagement with the band 12, and the pressure is maintained until the pilot's compartment has been turned through the desired angle. The wheel is then released. In order to tilt the upper member of the helicopter, the wheel is turned to cause the clutch to roll in a path against the band 12 when the wheel is pushed in. Obviously, the optimum location for the plunger 35 would be axially coincident with a radius of the equatorial great circle of the inner shell, for in this position the tendency of the clutch to slip would be minimum. The location of the plunger, as shown, is a compromise position, selected for the comfort of the pilot, since in the small sized helicopter chosen for illustrating the invention, there would not be room for the pilot to stand or sit directly between the drive shaft and hand wheel.

Each of the shells is provided with a door, said doors being respectively denoted as 49 and 50, hinged at one side and lockable at the other. The outer door opens outwardly, and the inner door opens inwardly. The outer door 49 must conform to the spherical shape of the interior wall of the outer shell, and since it is part of the band 12, it would be of the same material, since at times the ball bearing 17 may run over it.

In FIGURE 4 the doors are shown laterally displaced. In order to open the doors, the pilot must turn the lower member in an azimuthal direction until the doors are in substantial registry.

It will readily appear from the above description that a helicopter constructed according to the principles of my invention may safely descend vertically at slow speed under conditions of a dead motor, the airfoil functioning as a parachute, and that under the same conditions the pilot may glide to a landing, being thus able to select his landing spot. It is also obvious that the tiltability of the airfoil unitarily with the propellers creates the component of force for forward flight, without requiring the expensive and unreliable pitch varying systems which characterize present helicopters, thus enhancing the safety factor, greatly simplifying the construction, as well as reducing the cost of manufacture. It is also readily understandable that the unitary structure of the upper member through which the load bearing part of the helicopter is supported by the airfoil through the intermediary of the struts 5, is a much safer suspending structure for the weighted member of the helicopter than reliance solely upon the drive shaft for suspension, as in conventional helicopers. All of the features above described, and others inherent in this invention, contribute to the feasibility of manufacturing helicopters of larger size, greater load capacity, and increased safety than any helicopter now in being.

It is to be understood that the specific details of construction and arrangement of parts, and selection of specific instrumentalities as disclosed in the drawings and described in the specification are primarily by way of illustration and not to be construed as necessarily limiting the scope of protection to which the invention may be entitled.

What I claim is:

1. Helicopter comprising concentric shells of spherical curvature lapping in a zone intersected by their common, normally horizontal, equatorial plane, and slidably interfitting whereby they are retained against separation and capable of universal relative movement about their common center, said shells defining a pilot's compartment, a rigid airfoil above said shells, a propeller mounted thereupon rotatable about an axis fixed relative to said airfoil, struts, themselves rigid and rigidly joined to said airfoil having their lower ends rigidly secured to one of said shells, said airfoil, struts and the shell to which they are secured constituting a sustaining member, the other shell being weighted so that its center of gravity is below the center of relative universal movement, whereby said other shell hangs stably suspended from said sustaining member, and control means accessible from within said pilot's compartment operatively engaged with said sustaining member for tilting the latter in any desired direction about the common center of said shells and for rotating said other shell in azimuth.

2. Helicopter as claimed in claim 1, the shell which forms part of said sustaining member being open below the zone in which said shells lap, a power plant carried by said other shell and a driving connection between said power plant and propeller.

3. Helicopter as claimed in claim 1, the shell which forms part of said sustaining member being open below the zone in which said shell lap, and a floor for said pilot's compartment supported by said other shell.

4. Helicopter comprising an upper sustaining member including an airfoil and propellers mounted upon said airfoil on fixed parallel axes, a lower car member, a universal joint having complementary upper and lower relatively articulate elements, said sustaining member including the upper articulate element, and downwardly convergent struts, themselves rigid, and rigidly connected to said airfoil and to said upper articulate element, said lower articulate element being part of said car member, by means of which said car member is freely suspended from said sustaining member, and control means actuable from said car member operatively engaging said sustaining member, constructed to tilt the latter in any direction about the center of articulation of said joint, upon selective actuation of said control member, said car member including a pilot's compartment, the center of articulation of said universal joint being within the pilot's compartment.

(References on following page)

References Cited in the file of this patent

UNITED STATES PATENTS

| | | |
|---|---|---|
| 958,747 | Koskine | May 24, 1910 |
| 1,351,821 | Wilkinson | Sept. 7, 1920 |
| 1,549,938 | Warner | Aug. 18, 1925 |
| 1,599,468 | Henderson | Sept. 14, 1926 |
| 1,902,428 | Verstegen | Mar. 21, 1933 |
| 2,054,610 | Volpicelli | Sept. 15, 1936 |
| 2,216,080 | Johnson | Sept. 24, 1940 |
| 2,404,014 | Thornes | July 16, 1946 |
| 2,497,153 | Cosakis | Feb. 14, 1950 |
| 2,517,850 | Dillavou | July 8, 1950 |
| 2,611,554 | Sanders | Sept. 23, 1952 |